(12) United States Patent
Tanner et al.

(10) Patent No.: US 8,285,537 B2
(45) Date of Patent: Oct. 9, 2012

(54) RECOGNITION OF PROPER NOUNS USING NATIVE-LANGUAGE PRONUNCIATION

(75) Inventors: Marc D. Tanner, Morgantown, WV (US); Erin M. Panttaja, Somerville, MA (US)

(73) Assignee: Comverse, Inc., Wakefield, MA (US)

( * ) Notice: Subject to any disclaimer, the term of this patent is extended or adjusted under 35 U.S.C. 154(b) by 3080 days.

(21) Appl. No.: 10/355,148

(22) Filed: Jan. 31, 2003

(65) Prior Publication Data

US 2004/0153306 A1 Aug. 5, 2004

(51) Int. Cl.
*G06F 17/28* (2006.01)

(52) U.S. Cl. ........... 704/4; 704/246; 704/247; 704/251; 704/252

(58) Field of Classification Search .................. None
See application file for complete search history.

(56) References Cited

U.S. PATENT DOCUMENTS

| | | | | |
|---|---|---|---|---|
| 5,040,218 A * | 8/1991 | Vitale et al. | | 704/260 |
| 5,212,730 A * | 5/1993 | Wheatley et al. | | 704/243 |
| 5,682,501 A * | 10/1997 | Sharman | | 704/260 |
| 5,732,395 A * | 3/1998 | Silverman | | 704/260 |
| 5,805,771 A | 9/1998 | Muthusamy et al. | | |
| 5,815,639 A | 9/1998 | Bennett et al. | | |
| 5,920,837 A | 7/1999 | Gould et al. | | |
| 5,926,787 A | 7/1999 | Bennett et al. | | |
| 6,078,885 A * | 6/2000 | Beutnagel | | 704/258 |
| 6,085,160 A | 7/2000 | D'hoore et al. | | |
| 6,212,500 B1 | 4/2001 | Köhler | | |
| 6,243,669 B1 | 6/2001 | Horiguchi et al. | | |
| 6,272,464 B1 * | 8/2001 | Kiraz et al. | | 704/257 |
| 6,314,165 B1 * | 11/2001 | Junqua et al. | | 379/88.03 |
| 6,374,224 B1 | 4/2002 | Horiguchi et al. | | |
| 6,460,017 B1 | 10/2002 | Bub et al. | | |
| 7,092,873 B2 * | 8/2006 | Engelsberg et al. | | 704/200.1 |
| 2002/0040296 A1 | 4/2002 | Kienappel | | |
| 2002/0046025 A1 | 4/2002 | Hain | | |
| 2002/0049591 A1 | 4/2002 | Hain | | |
| 2002/0087314 A1 | 7/2002 | Fischer et al. | | |
| 2002/0111810 A1 * | 8/2002 | Khan et al. | | 704/275 |
| 2003/0225571 A1 * | 12/2003 | Levin et al. | | 704/201 |
| 2007/0005567 A1 * | 1/2007 | Hermansen et al. | | 707/3 |

OTHER PUBLICATIONS

T. Vitale, "An Algorithm for High Accuracy Name Pronunciation by Parametric Speech Synthesizer", Computational Linguistics, vol. 17, No. 3, pp. 257-276, 1991.

* cited by examiner

*Primary Examiner* — Leonard Saint Cyr

(74) *Attorney, Agent, or Firm* — Ohlandt, Greeley, Ruggiero & Perle, L.L.P.

(57) ABSTRACT

Recognition of proper nouns by an automated speech recognition system is improved by augmenting the pronunciation of each proper noun or name in the natural language of the speech recognition system with at least one "native" pronunciation in another natural language. To maximize recognition, preferably the pronunciations are predicted based on information not available to the speech recognition system. Prediction of pronunciation may be based on a location derived from a telephone number or postal address associated with the name and the language or dialect spoken in the country or region of that location. The "native" pronunciation(s) may be added to a dictionary of the speech recognition system or directly to the grammar used for recognizing speech.

61 Claims, 4 Drawing Sheets

RECOGNITION OF PROPER NOUNS USING NATIVE-LANGUAGE PRONUNCIATION

BACKGROUND OF THE INVENTION

1. Field of the Invention

The present invention is directed to automated recognition of words spoken by users and, more particularly, to recognizing proper nouns using pronunciation specific to one or more geographical areas.

2. Description of the Related Art

A number of techniques are used in automatic recognition of words spoken by users without prior training of the recognition system for each user. One of the most common is limiting the number of words to be recognized, i.e., the grammar used by the recognition system. Another is to attempt to direct the user to a speech recognizer for a particular language, e.g., based on the location of the user. In the case of centralized systems receiving telephone calls from users, the telephone number of the user may provide an indication of the user's pronunciation. In addition, automatic language identification methods, such as those disclosed in U.S. Pat. No. 5,805,771 might be used, or other information provided by a user, such as the language selected for the user interface. However, some words, such as those borrowed from another language or proper nouns, may be pronounced differently than expected for a particular user of some applications, such as voice activated dialing and directory assistance.

Methods of determining pronunciation of personal names have been proposed previously, e.g., in Vitale, Tony, "An Algorithm for High Accuracy Name Pronunciation by Parametric Speech Synthesizer," Journal of Computational Linguistics, pp. 257-276, 1991 which describes an algorithm to determine ethnic origin of a name based on spelling. However, known methods do not take into account other information that may be available to a system attempting to recognize a name or other proper noun spoken by a user.

Typically, speech recognition systems are localized for a particular language. However, proper nouns may not use the same pronunciation rules as other words in the language, e.g., the string "Jose" in "San Jose," compared to the same string in "Joseph." To improve recognition of such proper nouns, it is necessary to augment the speech recognizer of the localized application. There is no known method for accomplishing this automatically or even semi-automatically.

SUMMARY OF THE INVENTION

It is an aspect of the present invention to improve recognition of proper nouns in a speech recognition system.

It is another aspect of the present invention to provide alternative pronunciations for proper nouns.

It is a further aspect of the present invention to identify a likely pronunciation of a proper noun based on information available to an application associated with, but not part of an automatic speech recognizer.

The above aspects can be attained by a method of improving automated recognition of proper nouns spoken by users, including predicting at least one native pronunciation in at least one natural language of a proper noun stored as text, and augmenting a speech recognizer, that is not designed to recognize words in the at least one natural language, using the at least one native pronunciation of the proper noun.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
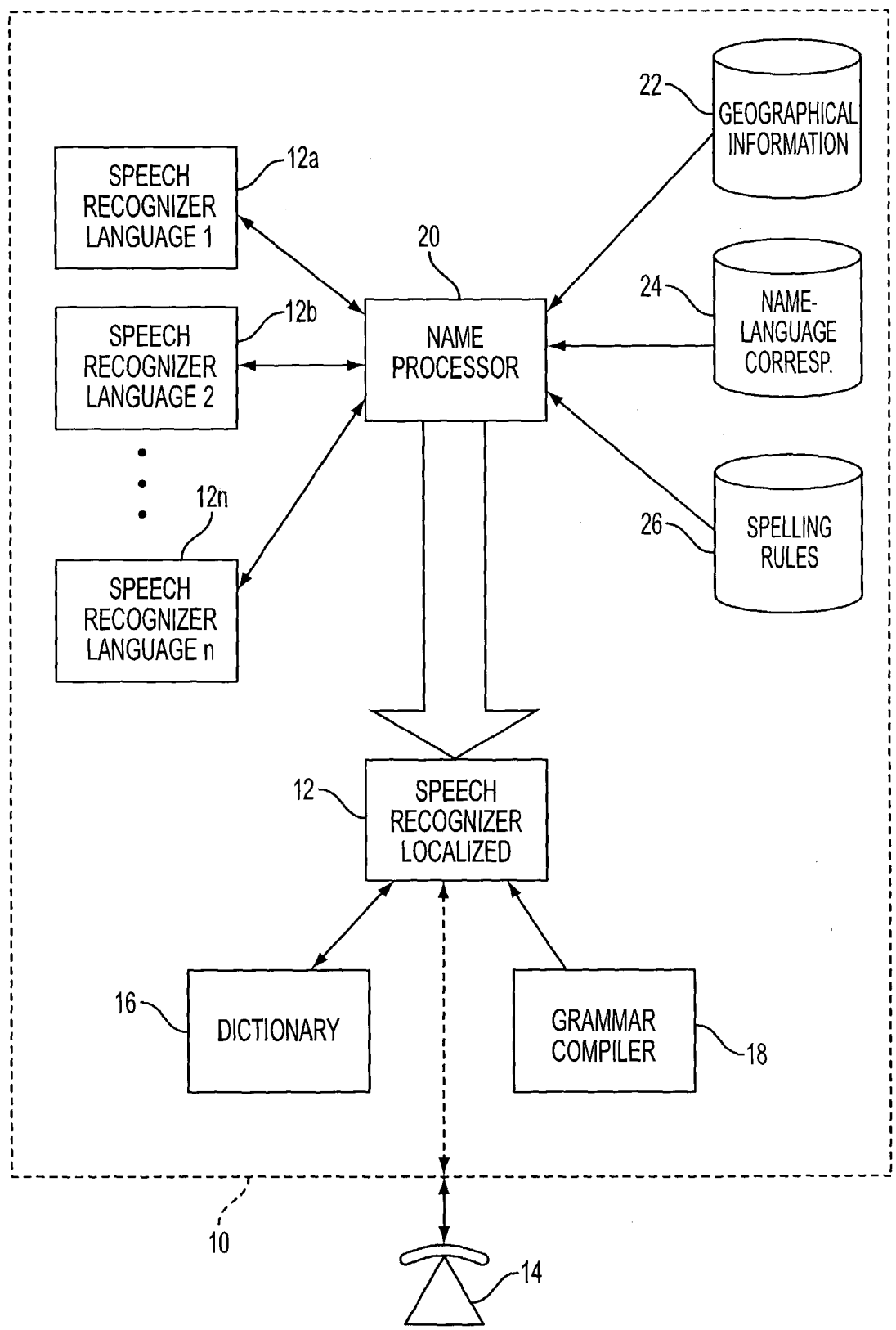
FIG. 1 is a block diagram of a communication system including an automatic speech recognition system that is augmented according to the present invention.

As illustrated in FIG. 1, a system 10 utilizing the present invention includes a speech recognizer 12 capable of recognizing speech in at least one natural language or dialect of users represented by a telephone 14. Speech recognizer 12 may be any conventional system for recognizing speech, such as that disclosed in published U.S. patent application U.S. 2002-0087328-A1 incorporated herein by reference. Speech recognizer 12 may access dictionary 16 and grammar compiler 18 to create a phonetically defined grammar of words that can be recognized at particular points in time as is common for speech recognition systems accessed via telephone 14. However, the present invention is not limited to speech recognizers accessed by multiple users via telephones, but may also be implemented in a single cellular telephone, a desktop computer system, or any other device using speech recognition, including household appliances, automobile navigation systems, public information kiosks, etc.

Speech recognition systems may be designed to provide a set of basic functionalities to a user base which consists of speakers of many different natural languages. In this case, a generic application is typically written which is then "localized" to provide several different voice user interfaces, one for each language. In the case of system 10, speech recognizers 12a, 12b and 12n each represent speech recognition software that has been localized for a specific language. Each user accesses the application in his or her preferred natural language which may be identified at time of set up of the application (in the case of a stand-alone device), by the telephone number of the user, or by user selection. For example, the user's language may be determined at the time that a centralized system is called by the user, either by listening to the first word spoken or asking which language to use.

In a speech recognition system which uses speech recognizer 12 with a localized application grammar, grammar compiler 18 analyzes the localized application's grammar and determines one or more pronunciations for each phrase in the grammar which are likely to match the way a speaker of that language would say the phrases in that grammar. This produces a compiled grammar which is specific to at least one language that is then used for recognition of speech input. This process may occur just before the time of actual recognition, or the grammars may be pre-compiled and stored for later use.

The process of "localizing" a generic multi-lingual application conventionally requires manually rewriting the grammars used by the application before they are processed by grammar compiler 18. One major exception is the proper nouns used by the application which do not change from language to language. However, the grammar compiler 18 may generate very different localized pronunciations for the same proper noun, depending on which language and compiler is used.

For example, following are pronunciations for the name "Gilberto Jones" which were automatically generated by grammar compilers associated with speech recognizers for five different languages:

| | |
|---|---|
| American English: | g l l b *r ! o d Z o n z |
| | g l l b E r t o d Z o n z |
| American Spanish: | x i l b e ! t o t S o n s |
| Brazilian Portuguese: | Z l w b E x t U Z o~n l S |
| | Z l w b E x t U Z o~n l s |
| French: | Z i l b * r t o d Z o n z |
| | Z i l b E r t O d Z o n z |
| | Z i l b E r t o d Z o n z |
| Italian: | d Z i l b E r t o d Z O n s |

Any of the above pronunciations might be correct, but they merely represent guesses, since the grammar compilers do not know the way that Gilberto Jones himself says his name. Conventional systems which localize pronunciation of proper nouns based on the location of users provide reasonably accurate recognition for users who are unfamiliar with the names. However, accuracy degrades for users who are more familiar with the people in the list and pronounce the names more closely to the way that the named individuals do. This is a particular problem in systems with a large number of users and names from many different "native" languages or dialects. The present invention attempts to select the appropriate pronunciation based upon additional information available to the application that uses speech recognizer 12. This information is used to identify the "native" pronunciation for the name.

According to the present invention, recognition of names or other proper nouns is improved by adding to the default pronunciation in the local language(s) of the user(s) one or more additional "native" pronunciations for the name. This is accomplished by storing information to identify a geographical area from information available to an application other than the speech recognizer and pronunciations for proper nouns in each geographical area.

In the embodiment illustrated in FIG. 1, name processor 20 has access to geographical information 22, name-language correspondence 24 and spelling rules 26 which are language specific. However, all implementations of the present invention may not include all of these types of data for identifying pronunciation of a name or other proper noun. For example, if the application using speech recognizer 12 does not have any data that could make use of geographical information 22, this set of data would not need to be included.

Examples of data included in geographical information 22 may include sources of information associated with proper nouns, such as address book(s) with names and phone numbers and/or addresses. In addition, geographical information 22 may include codes or words used in addresses or telephone numbers, such as country codes in telephone numbers, with corresponding languages or dialects. Similarly, country names or abbreviations used in street addresses may be included in geographical information 22. It may also be possible to identify areas within a country in which a particular language or dialect is prominent using street addresses or telephone area codes stored in geographical information 22. For example, the area codes for Quebec, Canada could be used to identify Canadian French pronunciation.

Name-language correspondence 24 provides another way of predicting the native pronunciation of a name. Some names are much more common in one or more particular languages. For example, "Dietmar" is rarely used among people who do not speak German. Names of individuals or other proper nouns that include more than one word may be identified by the combination of words. Another example is a name such as "Ng" associated with Vietnamese. For example, the name "Gilberto Jones" might have any of the first three pronunciations above, since "Gilberto" is not common in America, but "Jones" is. If there is geographical information indicating that the second French pronunciation is also likely, all four of these pronunciations might be included in the grammar if an application associated with speech recognizer 12 has determined that "Gilberto Jones" is a name that a user might speak.

Language specific spelling rules 26 may be based on the techniques described in the article by Vitale noted above and include combinations of letters that do not form complete words and are only found in certain languages, such as "schm" in German and "ette" in French. These letter combinations may be used to predict the pronunciation of words containing the letters, or multi-word names that include a word containing one of these letter combinations.

One problem with using spelling rules 26 and name-language correspondence 24 is that people move from one country to another and typically retain the spelling, but not necessarily the pronunciation of the their names. A related problem is regions in which names and languages are mixed, such as Alsace where the spellings may be German, but the pronunciation may be French. A well-known example is "Schlumberger" which has a spelling that looks German, but the company by that name uses a French pronunciation. For these reasons it is useful to add as many different pronunciations as the various methods described herein suggest, e.g., both the French and German pronunciations in this example (since a user might use either and the system may have no way to know which is correct).

The data stored in geographical information 22, name-language correspondence 24 and language-specific spelling rules 26 may be generated automatically, manually, or semi-automatically, the last type of data being compiled automatically and edited manually. For some applications, geographical information 22 may be generated completely automatically. However, manual editing may be required to identify regions within a country that speak a particular language or dialect. Furthermore, the ideal way to determine the native pronunciation of a name is to ask the person to say his or her name out loud. These utterances can be transcribed by hand into one or more pronunciations, written in a standard phonetic spelling such as the International Phonetic Alphabet and stored for later use. This could be done for all or part of every name in a list of common names for a language of the region.

Due to the large amount of human labor involved in writing pronunciations by hand, typically an automated tool is used to generate native pronunciations. Conventional speech recognizers and text-to-speech software typically include a dictionary of local pronunciations for common words, including names. They also typically include pronunciation rules for words that are not in the dictionary. The automatic tools may produce phonetic spellings of names using the standard phonetic alphabet or a phonetic alphabet that is language-specific for a recognizer. In the latter case, it may be necessary to convert from the language-specific phonetic alphabet to either a language independent or standard phonetic alphabet, or directly to a different language-specific phonetic alphabet, as discussed in more detail below. These results may be further edited manually, or used as provided by the automated tool.

Figure 2A:
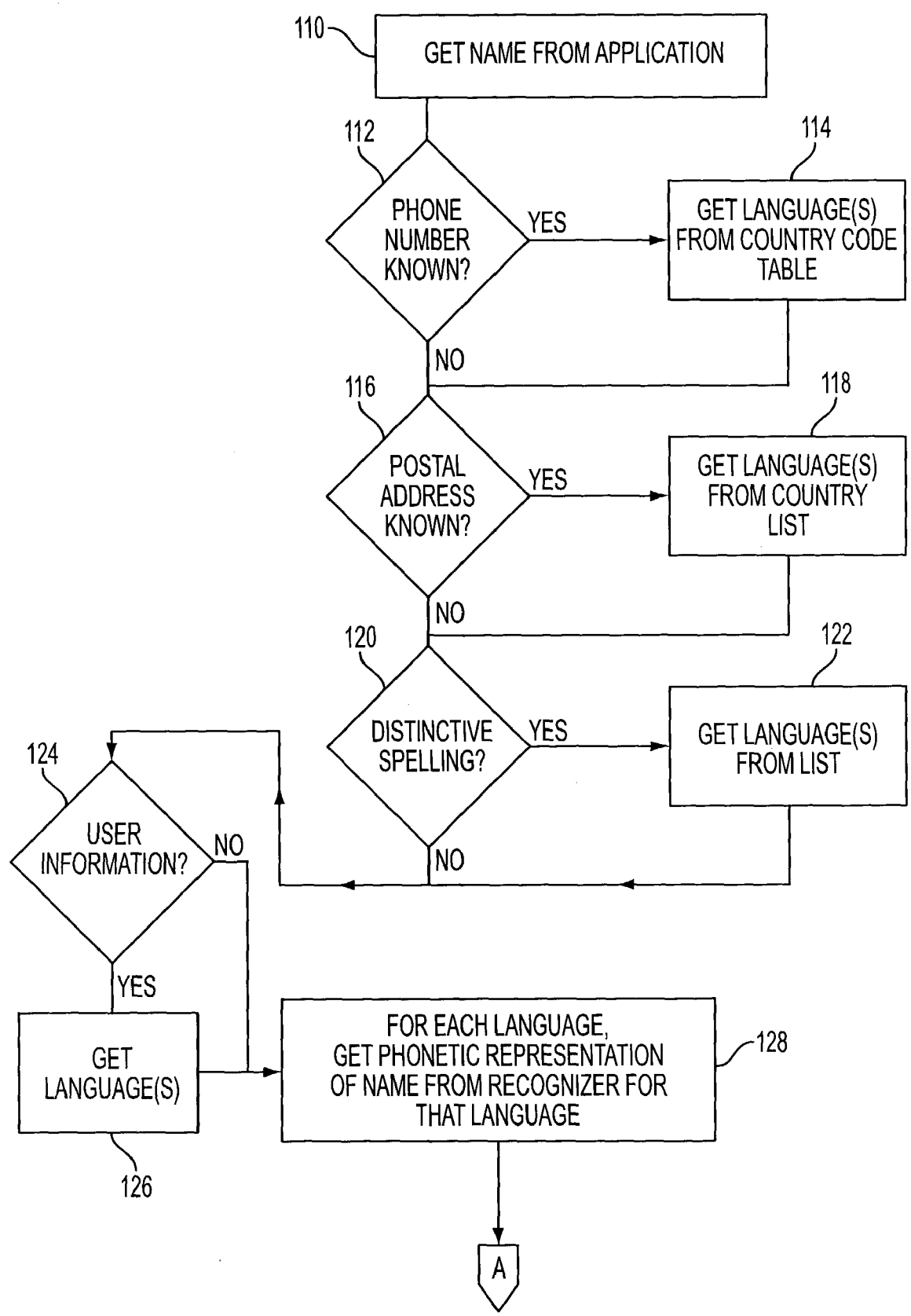
FIGS. 2A-2C and 3 are flowcharts of methods for augmenting an automatic speech recognition system according to the present invention.
Figure 2B:
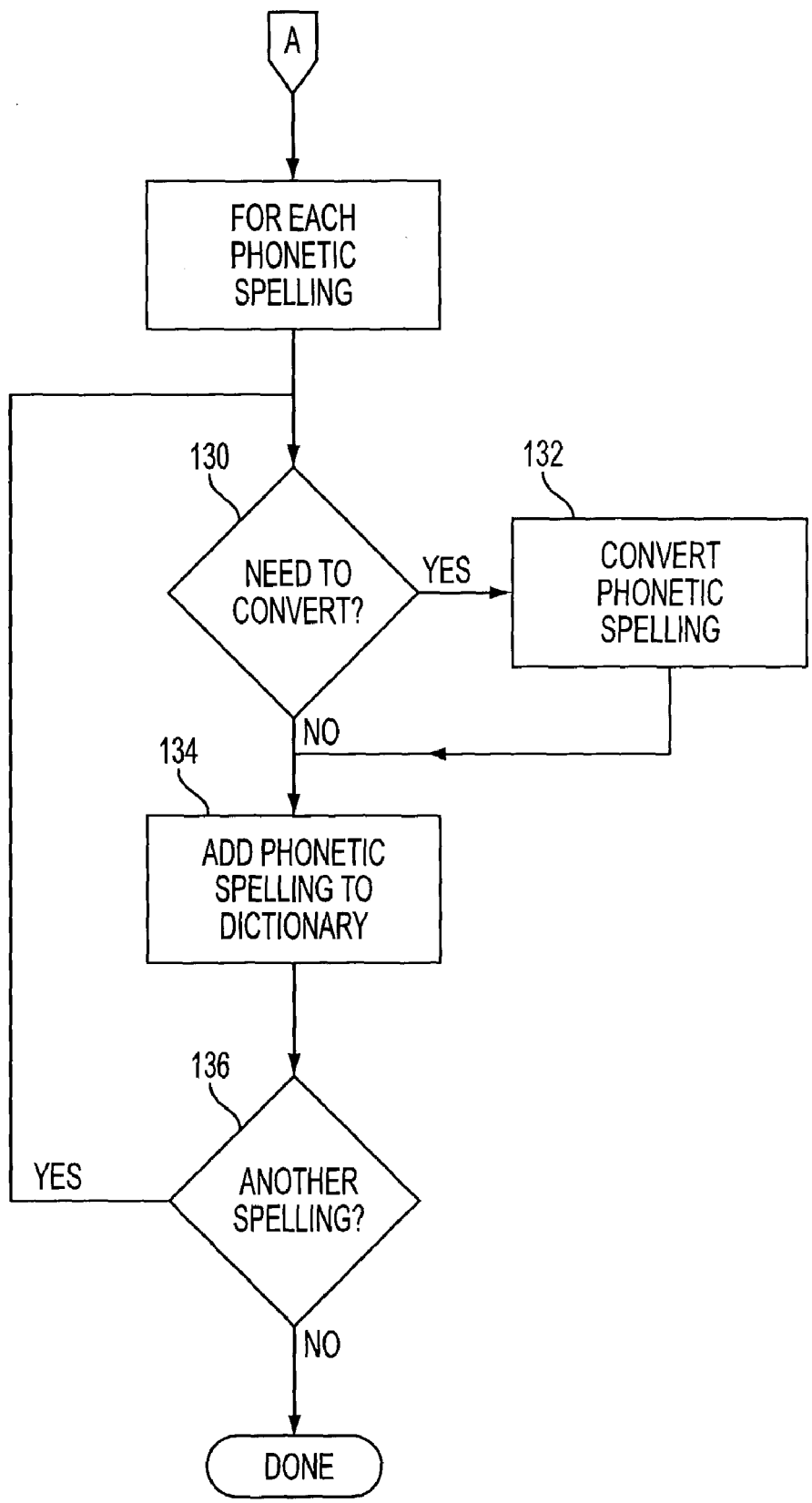
Figure 2C:
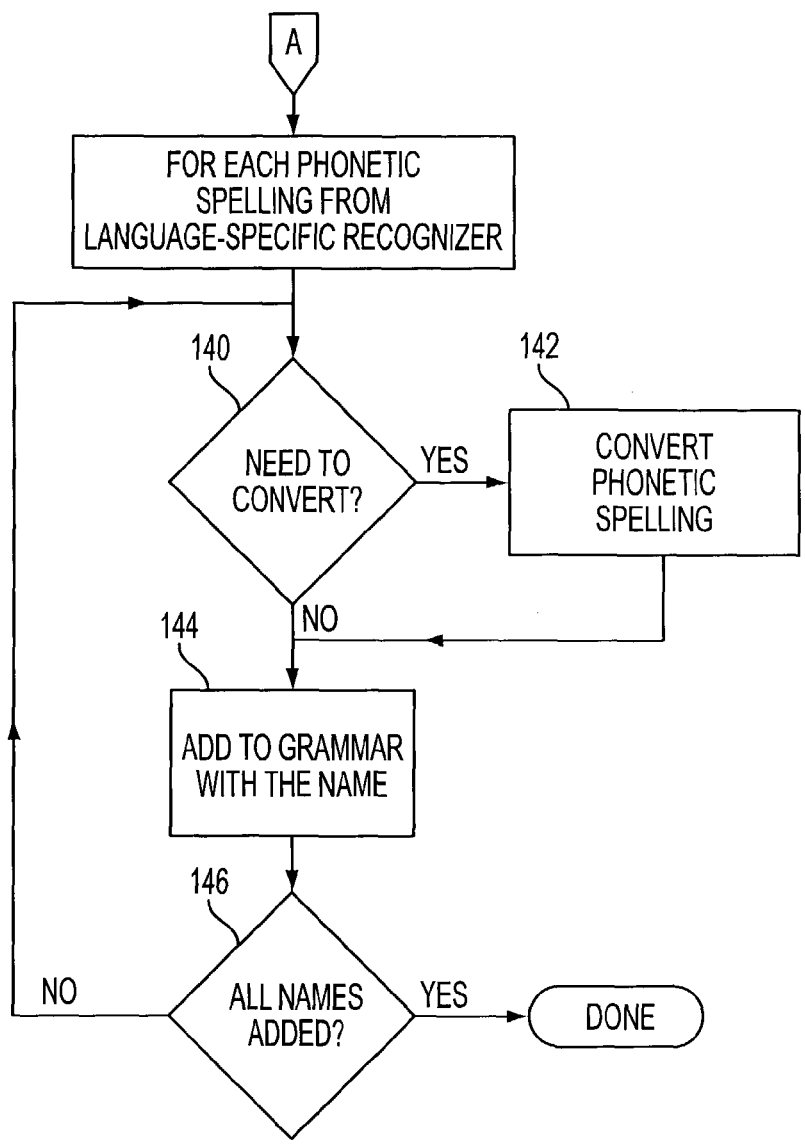

An example of a method for adding pronunciation of names in a telephone dialing application is illustrated in FIGS. 2A-2C. As illustrated in FIG. 2A, name processor 20 receives 110 a name from the telephone dialing application. If it is determined 112 that a phone number is associated with the name, the languages, dialects or other pronunciation rules are obtained 114 from geographical information 22 using the country code or area code of the phone number. For example, country code 52 is Mexico and country code 55 is Brazil and therefore, Spanish and Portuguese pronunciations would be added, respectively, for these country codes. Similarly, area codes 514, 450, 418 and 819 are in Quebec and therefore one or more Canadian French pronunciation would be added if the telephone number contains this area code and the country code for the USA and Canada.

Next, it is determined 116 whether the postal address is available from the application. For example, a name, telephone number and address may be stored by the application in a directory (specific to the user on telephone 14 or available to many users), or there may be a billing address associated with the name. If so, the language(s) used in each country or region identified as possibly associated with the name are obtained 118.

Next, it is determined 120 whether the name has a distinctive spelling, either as an entire word in the name, using name-language correspondence 24, or a combination of letters found only in one or more languages using language-specific spelling rules 26. If so, the appropriate language(s) are obtained 122 from stored data.

Finally, if it is determined 124 that the application has information about the user that would indicate a non-local pronunciation might be used, the language(s) that might be used are obtained 126. For example, the users might have indicated to the application which language they use, but the speech recognizer for that language is not being used by the application, e.g., there are some pronunciations of proper nouns in the indicated language, but localized speech recognizer 12 does not recognize that language. Other possible ways of determining the language of the user include the postal address or phone number of the user, analysis of the user's name, or pronunciation of words previously by that user, whether in the current session or previous one(s).

Using the language(s) obtained in one or more of operations 114, 118, 122 and 126, phonetic representations of the name are obtained 128 for each language. These phonetic representations may be obtained 128 from speech recognizer 12a, 12b, . . . 12n for that language. In this case, the phonetic alphabet used may be language-specific, or recognizer-specific, particularly if name processor 20 is added to an existing application with previously defined dictionaries. Preferably, new implementations of the invention would use a standard phonetic alphabet, such as the International Phonetic Alphabet for proper nouns in all speech recognizers 12 so that no conversion is necessary.

The next operations performed by a method according to the present invention differ depending upon the capabilities of localized speech recognizer 12. If dictionary 16 can be updated, the operations illustrated in FIG. 2B are performed. For each phonetic spelling, if needed 130, the spelling is converted 132 to a new phonetic alphabet, and the spelling is added 134 to dictionary 16, until it is determined 136 that no other possible spellings were identified. The procedure followed if dictionary 16 cannot be updated is illustrated in FIG. 2C. For each phonetic spelling, if needed 140 the spelling is converted 142 to a new phonetic alphabet, and the spelling is added 144 directly to the grammar used by speech recognizer 12.

Phonetic spelling conversion 132, 142 refers to changing the representation of a native pronunciation of the name obtained from the speech recognizer 12a, 12b or 12n for one language into a different language-specific phonetic alphabet used by the speech recognizer 12 or the grammar compiler 18. There are known techniques for converting between phonetic alphabets, such as those disclosed in U.S. Pat. No. 6,460,017 and published U.S. patent application US 2002/0040296 A1, both incorporated herein by reference. For example, if the American Spanish pronunciation of "Gilberto Jones", i.e., "xilbe! to tSons" in International Phonetic Alphabet, needs to be converted to a phonetic alphabet used by an American English grammar compiler, the following conversions would be made:

$$x \rightarrow h$$
$$i \rightarrow ee$$
$$! \rightarrow hd$$
$$tS \rightarrow ch$$
$$o \rightarrow oe$$
$$s \rightarrow ss$$

This produces "heelbehdtoe choenss" which can then be inserted into the grammar. A similar mapping exists for converting into a phonetic representation suitable for inserting into dictionary 16. The language-specific phonetic spelling of the native pronunciation for the name is then added 144 to the grammar used by speech recognizer 12 until all names have been added 146.

Figure 3:
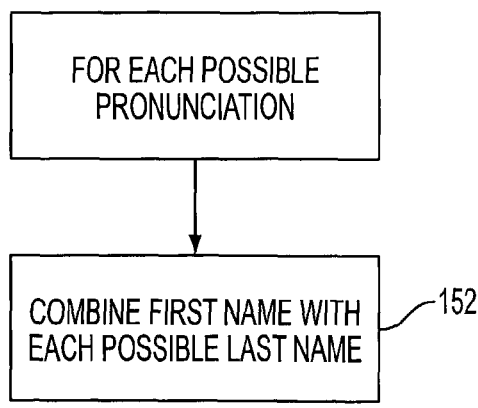

As noted above, proper nouns may include more than one word, each of which may have multiple pronunciations. This must be taken into account in the case of a phrase-based speech recognizer 12 for which dictionary 16 cannot be updated. In this case, preferably all permutations of the pronunciations of the words are combined 152, as illustrated in FIG. 3, and added 144 (FIG. 2C) to the grammar of speech recognizer 12.

In applications where there are a large number of proper nouns that might be spoken by a user, e.g., an automated telephone directory, it is likely that there are duplicate names in geographical information database 22. When there is information associated with each of two identical names that predicts different pronunciation of the names, a system according to the present invention may save information associating the pronunciation with the entry, so that if a user uses a "native" pronunciation that is likely to be associated with only one of the names, subsequent action (e.g., supplying or dialing the phone number) may use information associated with the name having that "native" pronunciation.

For example, consider an application running in the United States of America having a grammar with "Gilberto Jones" from Mexico, and "Gilberto Jones" from Brazil. If dictionary 16 cannot be updated, the grammar of speech recognizer 12 would include an American Spanish (Mexican) pronunciation, two Brazilian pronunciations and an American English pronunciation, based on the pronunciation examples provided above. If the user speaks one of the "native" pronunciations for Mexico or Brazil, the application can determine which Gilberto Jones the user likely wants. If the user speaks something which matches the American English pronunciation, then the application will have to ask which one.

If the invention is implemented by augmenting dictionary 16 and there are different "native" pronunciations for "Gilberto Jones," the application could add the following "dummy" words (with pronunciations) to dictionary 16 (assuming it already has the American English pronunciation associated with "Gilberto Jones")

| @@gilberto-jones-mexico@@: | x i l b e ! t o t S o n s |
|---|---|
| @@gilberto-jones-brazil@@: | Z l w b E x t U Z o~ n l S |
| | Z l w b E x t U Z o~ n l s | so that speech recognizer 12 will include "Gilberto Jones", "@@gilberto-jones-mexico@@", and "@@gilberto-jones-brazil@@" as alternatives in its grammar. Depending on what the user speaks, the recognizer may return one of the three. If the recognizer returns "Gilberto Jones", the response is ambiguous. But, if the recognizer returns "@@gilberto-jones-mexico@@" or "@@gilberto-jones-brazil@@", it means the recognizer heard a native pronunciation, and so the application can distinguish which name the user pronounced.

There are two ways that the "native" pronunciation of a proper noun could be represented and two different ways that speech recognizer 12 can be augmented with the pronunciations. The "native" pronunciations may be represented by a phonetic alphabet, either recognizer (and optionally language) independent or in the phonetic alphabet of speech recognizer 12, or the "native" pronunciation can be converted to a textual approximation to which the pronunciation rules of speech recognizer 12 are applied, e.g., by grammar compiler 18. In addition, the "native" pronunciation(s) may be added as an alternative pronunciation of the same word, or by identifying each "native" pronunciation as a word that is different than the localized pronunciation of that word.

The present invention has been described with respect to an exemplary speech recognition system. However, it should be readily apparent that the invention may be used in many applications, such as directory assistance and voice-activated dialing. It should also be apparent that the term "proper nouns" as used herein refers to both names of persons, as used in the examples, as well as geographic place names. Particularly relevant sources of pronunciation information for place names include: (1) current recognizer language (default); (2) native language of the speaker, if known; (3) language of the country/region in which the place is located; and (4) source language of the place name.

In addition, the pronunciation could be used by the application subsequently after the proper noun is recognized. For example, a dialing application could say "dialing Gilberto Jones at . . . " using synthesized speech of the pronunciation that speech recognizer 12 thought was a match, followed by the phone number associated with the name. In the case of a personal assistant (running on a centralized system or stand-alone device), the pronunciation could be stored for future use, e.g., to announce the e-mail or voice mail from the person whose name was recognized.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of improving automated recognition of proper nouns spoken by users, comprising:
predicting at least one native pronunciation, in at least one natural language, of a proper noun stored as text, based on information associated with the proper noun but not derived from the text of the proper noun; and
augmenting a speech recognizer, that is not configured to recognize words in the at least one natural language, using the at least one native pronunciation of the proper noun.

2. A method as recited in claim 1, wherein said predicting uses data available to an application other than the speech recognizer.

3. A method as recited in claim 2, wherein said predicting is based on a country associated with the proper noun.

4. A method as recited in claim 3, wherein said predicting also uses spelling of the proper noun.

5. A method as recited in claim 3, wherein the country is derived from a postal address associated with the proper noun.

6. A method as recited in claim 5, wherein said predicting also uses spelling of the proper noun.

7. A method as recited in claim 3, wherein the proper noun is a name and the country is derived from a telephone number associated with the name.

8. A method as recited in claim 7, wherein said predicting also uses spelling of the proper noun.

9. A method as recited in claim 2 wherein said predicting is based on at least one of information about a user and a response by the user to an application supplying speech input from the user to the speech recognizer.

10. A method as recited in claim 2,
wherein the speech recognizer is able to recognize words in a first language, and
wherein the proper noun is a name and said predicting includes comparing the name with a list of names associated with at least one language different from the first language.

11. A method as recited in claim 10, wherein said augmenting obtains the at least one native pronunciation of the proper noun from a list of phonetic spellings at least partially created manually.

12. A method as recited in claim 11, further comprising generating the at least one native pronunciation for at least one geographical area using at least one automated tool for text-to-speech conversion.

13. A method as recited in claim 2, wherein said augmenting includes adding at least one native pronunciation of the proper noun to a dictionary used by the speech recognizer.

14. A method as recited in claim 13,
further comprising storing at least one native pronunciation of the proper noun represented in a language independent phonetic alphabet; and
wherein said augmenting includes converting a representation of the at least one native pronunciation of the proper noun in the language independent phonetic alphabet into a language-specific phonetic alphabet used by the speech recognizer prior to said adding of the at least one native pronunciation to the dictionary.

15. A method as recited in claim 13,
further comprising storing at least one native pronunciation of the proper noun represented in a first phonetic alphabet specifically for a first language; and
wherein said augmenting includes converting a representation of the at least one native pronunciation of the proper noun in the first phonetic alphabet into a second phonetic alphabet specifically for a second language used by the speech recognizer prior to said adding of the at least one native pronunciation to the dictionary.

16. A method as recited in claim 13, wherein said augmenting uses a standard phonetic alphabet to add the at least one native pronunciation of the proper noun to the dictionary.

17. A method as recited in claim 13, wherein said augmenting uses an approximation of the at least one native pronunciation of the proper noun in a phonetic alphabet of the recognizer.

18. A method as recited in claim 13, wherein said augmenting adds a plurality of different native pronunciations of the proper noun to the dictionary.

19. A method as recited in claim 18, wherein the dictionary ordinarily has one record with one pronunciation per proper noun and said augmenting adds the different native pronunciations in separate records for the proper noun.

20. A method as recited in claim 2, wherein said method further comprises converting the at least one native pronunciation of the proper noun into a format of a grammar used by the speech recognizer.

21. A method as recited in claim 20, wherein the speech recognizer is able to recognize words in a first language, while the native pronunciation of the proper noun is for a second language different than the first language.

22. A method as recited in claim 21, wherein said converting includes approximating the native pronunciation of the proper noun in the second language in text to which pronunciation rules of the first language will be applied by the speech recognizer.

23. A method as recited in claim 2, wherein said augmenting adds a plurality of different native pronunciations of the proper noun to a grammar used by the speech recognizer.

24. A method as recited in claim 2, wherein said augmenting includes approximating the native pronunciation of the proper noun in the second language in text to which pronunciation rules of the first language will be applied by the speech recognizer.

25. A method as recited in claim 2,
further comprising storing at least one native pronunciation of the proper noun represented in a language independent phonetic alphabet; and
wherein said augmenting includes converting a representation of the at least one native pronunciation of the proper noun in the language independent phonetic alphabet into a language-specific phonetic alphabet used by the speech recognizer prior to said augmenting.

26. A method as recited in claim 2,
further comprising storing at least one native pronunciation of the proper noun represented in a first phonetic alphabet specifically for a first language; and
wherein said augmenting includes
converting a representation of the at least one native pronunciation of the proper noun in the first phonetic alphabet into a second phonetic alphabet specifically for a second language used by the speech recognizer; and
adding the at least one native pronunciation as represented in the second phonetic alphabet for use by the speech recognizer.

27. A method as recited in claim 2,
wherein the speech recognizer is able to recognize words in a first language,
wherein said predicting identifies multiple native pronunciations for the proper noun, including the at least one native pronunciation in at least one second language different from the first language, and
wherein said augmenting adds the at least one native pronunciation in the at least one second language.

28. A method as recited in claim 27, wherein each native pronunciation of the proper noun is added as an alternative pronunciation of the proper noun.

29. A method as recited in claim 27,
wherein each native pronunciation of the proper noun is added as a native pronunciation of a different proper noun, and
wherein said method further comprises supplying an identified proper noun to an application that determines the identified proper noun corresponds to the proper noun stored as text for which the at least one native pronunciation was predicted.

30. A method as recited in claim 29, wherein said augmenting includes approximating each native pronunciation of the proper noun in the second language in text to which pronunciation rules of the first language will be applied by the speech recognizer.

31. A method as recited in claim 2, further comprising synthesizing speech by the application using the native pronunciation corresponding to the identified proper noun.

32. A method as recited in claim 1, wherein the information associated with the proper noun is not based on characteristics of the users.

33. A method of improving automated recognition of proper nouns spoken by users, comprising:
predicting pronunciation of a proper noun in text, based on information associated with the proper noun but not obtained from the text containing the proper noun; and
generating a text string that, when pronounced as a word in a first natural language, sounds similar to the proper noun when pronounced in a second natural language selected based on said predicting.

34. A method as recited in claim 33, wherein said predicting is based on a country associated with the proper noun.

35. A method as recited in claim 33, wherein the country is derived from a postal address associated with the proper noun.

36. A method as recited in claim 35, wherein the proper noun is a name and the country is derived from a telephone number associated with the name.

37. A method as recited in claim 36, wherein said predicting identifies multiple pronunciations for the proper noun and said generating uses at least some of the multiple pronunciations.

38. A method as recited in claim 37, wherein said predicting uses data obtained from at least one automated tool for text-to-speech conversion that provides the at least one native pronunciation for at least one geographical area.

39. A method as recited in claim 33, wherein the information associated with the proper noun is not based on characteristics of the users.

40. At least one computer readable medium storing at least one program for controlling a computer system to automatically recognize proper nouns spoken by users according to a method comprising:
predicting pronunciation of a proper noun in text, based on information associated with the proper noun but not obtained from the text containing the proper noun; and
generating a text string that, when pronounced as a word in a first natural language, sounds similar to the proper noun when pronounced in a second natural language selected based on said predicting.

41. At least one computer readable medium as recited in claim 40, wherein said predicting is based on a country associated with the proper noun.

42. At least one computer readable medium as recited in claim 40, wherein the country is derived from a postal address associated with the proper noun.

43. At least one computer readable medium as recited in claim 42, wherein the proper noun is a name and the country is derived from a telephone number associated with the name.

44. At least one computer readable medium as recited in claim 43, wherein said predicting identifies multiple pronunciations for the proper noun and said generating uses at least some of the multiple pronunciations.

45. At least one computer readable medium as recited in claim 44, wherein said predicting uses data obtained from at least one automated tool for text-to-speech conversion that provides the at least one native pronunciation for at least one geographical area.

46. At least one computer readable medium as recited in claim 40, further comprising augmenting a speech recognizer, configured to recognize words in the first natural language, but not the second natural language, using the text string produced by said generating.

47. At least one computer readable medium as recited in claim 46, wherein said predicting is based on a country associated with the proper noun.

48. At least one computer readable medium as recited in claim 47, wherein the country is derived from a postal address associated with the proper noun.

49. At least one computer readable medium as recited in claim 47, wherein said predicting also uses spelling of the proper noun.

50. At least one computer readable medium as recited in claim 47, wherein the proper noun is a name and the country is derived from a telephone number associated with the name.

51. At least one computer readable medium as recited in claim 46 wherein said predicting is based on at least one of information about a user and a response by the user to an application supplying speech input from the user to the speech recognizer.

52. At least one computer readable medium as recited in claim 46, wherein the proper noun is a name and said predicting includes comparing the name with a list of names associated with at least one language different from the first language.

53. At least one computer readable medium as recited in claim 46, wherein said augmenting includes adding the text string to a dictionary used by the speech recognizer.

54. At least one computer readable medium as recited in claim 53, wherein said augmenting uses a standard phonetic alphabet in the text string.

55. At least one computer readable medium as recited in claim 53, wherein said augmenting uses a phonetic alphabet of the recognizer in the text string.

56. At least one computer readable medium as recited in claim 53, wherein the dictionary ordinarily has one record with one pronunciation per proper noun and said augmenting adds a plurality of text strings representing different native pronunciations in separate records for the proper noun.

57. At least one computer readable medium as recited in claim 46, wherein said augmenting adds a plurality of text strings representing different native pronunciations of the proper noun.

58. At least one computer readable medium as recited in claim 57, wherein each native pronunciation of the proper noun is added as an alternative pronunciation of the proper noun.

59. At least one computer readable medium as recited in claim 57,
wherein each native pronunciation of the proper noun is added as a native pronunciation of a different proper noun, and
wherein said method further comprises supplying an identified proper noun to an application that determines the identified proper noun corresponds to the proper noun stored as text for which the at least one native pronunciation was predicted.

60. At least one computer readable medium as recited in claim 46, further comprising converting a native pronunciation of the proper noun into the text string in a format of a grammar used by the speech recognizer.

61. At least one computer readable medium as recited in claim 40, wherein the information associated with the proper noun is not based on characteristics of the users.

* * * * *